(12) United States Patent
Veerasamy et al.

(10) Patent No.: US 9,784,027 B2
(45) Date of Patent: *Oct. 10, 2017

(54) VACUUM INSULATING GLASS (VIG) UNIT WITH METALLIC PERIPHERAL EDGE SEAL AND/OR METHODS OF MAKING THE SAME

(71) Applicant: Guardian Industries Corp., Auburn Hills, MI (US)

(72) Inventors: Vijayen S. Veerasamy, Ann Arbor, MI (US); Martin D. Bracamonte, Carleton, MI (US)

(73) Assignee: Guardian Glass, LLC, Auburn Hills, MI (US)

( * ) Notice: Subject to any disclaimer, the term of this patent is extended or adjusted under 35 U.S.C. 154(b) by 482 days.

This patent is subject to a terminal disclaimer.

(21) Appl. No.: 14/145,462

(22) Filed: Dec. 31, 2013

(65) Prior Publication Data

US 2015/0184446 A1    Jul. 2, 2015

(51) Int. Cl.
*E06B 3/66* (2006.01)
*E06B 3/677* (2006.01)
(Continued)

(52) U.S. Cl.
CPC ........ *E06B 3/6612* (2013.01); *E06B 3/66357* (2013.01); *E06B 3/6775* (2013.01);
(Continued)

(58) Field of Classification Search
CPC .. E06B 3/66304; E06B 3/66357; Y10T 80/22; Y10T 80/24
See application file for complete search history.

(56) References Cited

U.S. PATENT DOCUMENTS

| | | |
|---|---|---|
| 1,370,974 A | 1/1865 | Stetson |
| 1,448,351 A | 3/1923 | Kirlin |
| | (Continued) | |

FOREIGN PATENT DOCUMENTS

| | | |
|---|---|---|
| DE | 2951330 | 7/1981 |
| DE | 10 2007 029 031 A1 | 12/2008 |
| | (Continued) | |

OTHER PUBLICATIONS

Wikipedia Post Transition Metal definition, Nov. 4, 2016.*
(Continued)

*Primary Examiner* — Donald J Loney
(74) *Attorney, Agent, or Firm* — Nixon & Vanderhye P.C.

(57) ABSTRACT

Certain example embodiments relate to vacuum insulating glass units having edge seals based on solder alloys that, when reactively reflowed, wet metallic coatings pre-coated on the glass substrates' perimeters, and/or associated methods. The alloys may be based on materials that form a seal at temperatures that will not de-temper glass and/or decompose a laminate, and/or remain hermetic and lack porous structures in their bulks. Example alloys may be based on inter-metallics of Sn and one or more additional materials selected from post-transition metals or metalloids; Zintl anions (e.g., In, Bi, etc.) from Group 13, 14, 15 or 16; and transition metals (e.g., Cu, Ag, Ni, etc.); and excludes Pb. Thin film coatings in certain example embodiments work with the solder material to form robust and durable hermetic interfaces. Because low temperatures are used, certain example embodiments can use compliant and visco-elastic spacer technology based on lamellar structures and/or the like.

18 Claims, 5 Drawing Sheets

(51) Int. Cl.
*E06B 3/673* (2006.01)
*E06B 3/663* (2006.01)
(52) U.S. Cl.
CPC ...... *E06B 3/67326* (2013.01); *E06B 3/67334* (2013.01); *E06B 3/66304* (2013.01); *Y02B 80/24* (2013.01)

(56) References Cited

U.S. PATENT DOCUMENTS

| | | | |
|---|---|---|---|
| 1,774,860 | A | 9/1930 | Wendler et al. |
| 2,011,557 | A | 8/1935 | Anderegg |
| 2,303,897 | A | 12/1942 | Smith |
| 2,962,409 | A | 11/1960 | Ludlow et al. |
| 3,441,924 | A | 4/1969 | Peek et al. |
| 3,742,600 | A | 7/1973 | Lowell |
| 3,857,161 | A | 12/1974 | Hutchins, IV |
| 3,902,883 | A | 9/1975 | Bayer |
| 3,912,365 | A | 10/1975 | Lowell |
| 3,936,553 | A | 2/1976 | Rowe |
| 3,959,577 | A | 5/1976 | Frink |
| 3,990,201 | A | 11/1976 | Falbel |
| 4,064,300 | A | 12/1977 | Bhangu |
| 4,069,974 | A | 1/1978 | Zawacki |
| 4,130,408 | A | 12/1978 | Crossland et al. |
| 4,130,452 | A | 12/1978 | Indri |
| 4,305,982 | A | 12/1981 | Hirsch |
| 4,393,105 | A | 7/1983 | Kreisman |
| 4,422,280 | A | 12/1983 | Mertin et al. |
| 4,486,482 | A | 12/1984 | Kobayashi et al. |
| 4,514,450 | A | 4/1985 | Nowobilski et al. |
| 4,542,611 | A | 9/1985 | Day |
| 4,586,289 | A | 5/1986 | Jaeger |
| 4,598,520 | A | 7/1986 | Ellstrom |
| RE32,272 | E | 10/1986 | Funaki et al. |
| 4,683,154 | A | 7/1987 | Benson et al. |
| 4,780,164 | A | 10/1988 | Rueckheim et al. |
| 4,786,344 | A | 11/1988 | Beuther |
| 4,822,649 | A | 4/1989 | Canaud et al. |
| 4,824,215 | A | 4/1989 | Joseph et al. |
| 4,853,264 | A | 8/1989 | Vincent et al. |
| 4,865,672 | A | 9/1989 | Delbeck et al. |
| 4,874,461 | A | 10/1989 | Sato et al. |
| 4,886,095 | A | 12/1989 | Lisec |
| 4,909,874 | A | 3/1990 | Rueckheim |
| 4,909,875 | A | 3/1990 | Canaud et al. |
| 4,924,243 | A | 5/1990 | Sato et al. |
| 4,928,448 | A | 5/1990 | Phillip |
| 4,983,429 | A | 1/1991 | Takayanagi et al. |
| 5,005,557 | A | 4/1991 | Bachli |
| 5,017,252 | A | 5/1991 | Aldrich et al. |
| 5,027,574 | A | 7/1991 | Phillip |
| 5,124,185 | A | 6/1992 | Kerr et al. |
| 5,157,893 | A | 10/1992 | Benson et al. |
| 5,175,975 | A | 1/1993 | Benson et al. |
| 5,234,738 | A | 8/1993 | Wolf |
| 5,247,764 | A | 9/1993 | Jeshurun et al. |
| 5,270,084 | A | 12/1993 | Parker |
| 5,271,973 | A | 12/1993 | Huether |
| 5,313,761 | A | 5/1994 | Leopold |
| 5,315,797 | A | 5/1994 | Glover et al. |
| 5,366,574 | A | 11/1994 | Lenhardt et al. |
| 5,399,406 | A | 3/1995 | Matsuo et al. |
| 5,489,321 | A | 2/1996 | Tracy et al. |
| 5,494,715 | A | 2/1996 | Glover |
| 5,499,128 | A | 3/1996 | Hasegawa et al. |
| 5,596,981 | A | 1/1997 | Soucy |
| 5,657,607 | A | 8/1997 | Collins et al. |
| 5,664,395 | A | 9/1997 | Collins et al. |
| 5,739,882 | A | 4/1998 | Shimizu et al. |
| 5,753,069 | A | 5/1998 | Rueckheim |
| 5,855,638 | A | 1/1999 | Demars |
| 5,891,536 | A | 4/1999 | Collins et al. |
| 5,897,927 | A | 4/1999 | Tsai et al. |
| 5,902,652 | A | 5/1999 | Collins et al. |
| 6,049,370 | A | 4/2000 | Smith, Jr. et al. |
| 6,238,755 | B1 * | 5/2001 | Harvey ............... E06B 3/66328 156/109 |
| 6,383,580 | B1 | 5/2002 | Aggas |
| 6,506,472 | B1 | 1/2003 | Tanaka et al. |
| 6,946,171 | B1 | 9/2005 | Aggas |
| 8,857,698 | B2 | 10/2014 | Bouesnard et al. |
| 2006/0187608 | A1 | 8/2006 | Stark |
| 2011/0139857 | A1 * | 6/2011 | Hagen ..................... B23K 1/19 228/175 |
| 2012/0304696 | A1 | 12/2012 | Miller et al. |
| 2013/0074445 | A1 | 3/2013 | Jones |
| 2013/0136875 | A1 | 5/2013 | Veerasamy |
| 2013/0153550 | A1 | 6/2013 | Dear |
| 2013/0153551 | A1 | 6/2013 | Dear |
| 2013/0292000 | A1 | 11/2013 | Dennis et al. |
| 2013/0302542 | A1 | 11/2013 | Jones |
| 2013/0305785 | A1 | 11/2013 | Dennis et al. |
| 2013/0306222 | A1 | 11/2013 | Dennis et al. |
| 2013/0309425 | A1 | 11/2013 | Dennis et al. |
| 2014/0034218 | A1 | 2/2014 | Hogan et al. |
| 2014/0037869 | A1 | 2/2014 | Petrmichl et al. |
| 2014/0037870 | A1 | 2/2014 | Petrmichl et al. |
| 2014/0087099 | A1 | 3/2014 | Veerasamy et al. |
| 2015/0020466 | A1 | 1/2015 | Bouesnard et al. |

FOREIGN PATENT DOCUMENTS

| | | |
|---|---|---|
| EP | 0047725 | 12/1985 |
| EP | 0489042 | 6/1992 |
| EP | 0645516 | 3/1995 |
| EP | 0812696 | 12/1997 |
| EP | 0831073 | 3/1998 |
| EP | 0831073 | 10/1999 |
| FR | 2 482 161 | 11/1981 |
| FR | 2 752 012 | 6/1998 |
| WO | WO 97/00335 | 1/1997 |
| WO | WO 99/47466 | 9/1999 |
| WO | WO 2013/017345 | 2/2007 |
| WO | WO 2011/063704 | 6/2011 |
| WO | WO 2012/058938 | 5/2012 |
| WO | WO 2012/170566 | 12/2012 |

OTHER PUBLICATIONS

International Search Report for PCT/US2014/071875 mailed Apr. 15, 2015.
Product Data Sheet for Precision Spheres for BGAs (PGBA, CBGA, and TBGA), Indium Corporation of America (4 pp.).
Product Data Sheet for NC-SMQ® 80 Solder Paste, Indium Corporation of America (2 pp.).
Brochure for "Research Solder Kits," Indium Corporation of America (6 pp.) at least as early as Dec. 31, 2013.
Griffiths et al., "Fabrication of Evacuated Glazing at Low Temperature," Solar Energy, vol. 63, pp. 243-249 (7 pp.).
PCT International Search Report issued in Application No. PCT/US00/40300, dated Oct. 27, 2000 (4 pp.).
"Thermal Outgassing of Vacuum Glazing," by Lenzen, et al., School of Physics, Univ. of Sydney, NSW 2006 Australia (31 pp.).
"Temperature-Induced Stresses in Vacuum Glazing: Modelling and Experimental Validation" by Simko et al., Solar Energy, vol. 63, No. 1, pp. 1-21, 1998 (21 pp.).
"Current Status of the Science and Technology of Vacuum Glazing," by Collins, et al., Solar Energy, vol. 62, No. 3, pp. 189-213, 1998 (26 pp.).
Brochure for "Specialty Solders and Alloys, Technical Information" for Indium Corporation of America (6 pp). at least as early as Dec. 31, 2013.
U.S. Appl. No. 13/628,653, "Low Temperature Hermetic Sealing Via Laser," filed Sep. 27, 2012.
U.S. Appl. No. 13/562,386, "Vacuum Insulated Glass (VIG) Window Unit with Getter Structure and Method of Making Same," filed Jul. 31, 2012.
U.S. Appl. No. 13/562,408, "Method of Making Vacuum Insulated Glass (VIG) Window Unit Including Activating Getter," filed Jul. 31, 2012.

(56) References Cited

OTHER PUBLICATIONS

U.S. Appl. No. 13/562,423, "Vacuum Insulated Glass (VIG) Window Unit Including Hybrid Getter and Method of Making the Same," filed Jul. 31, 2012.

* cited by examiner

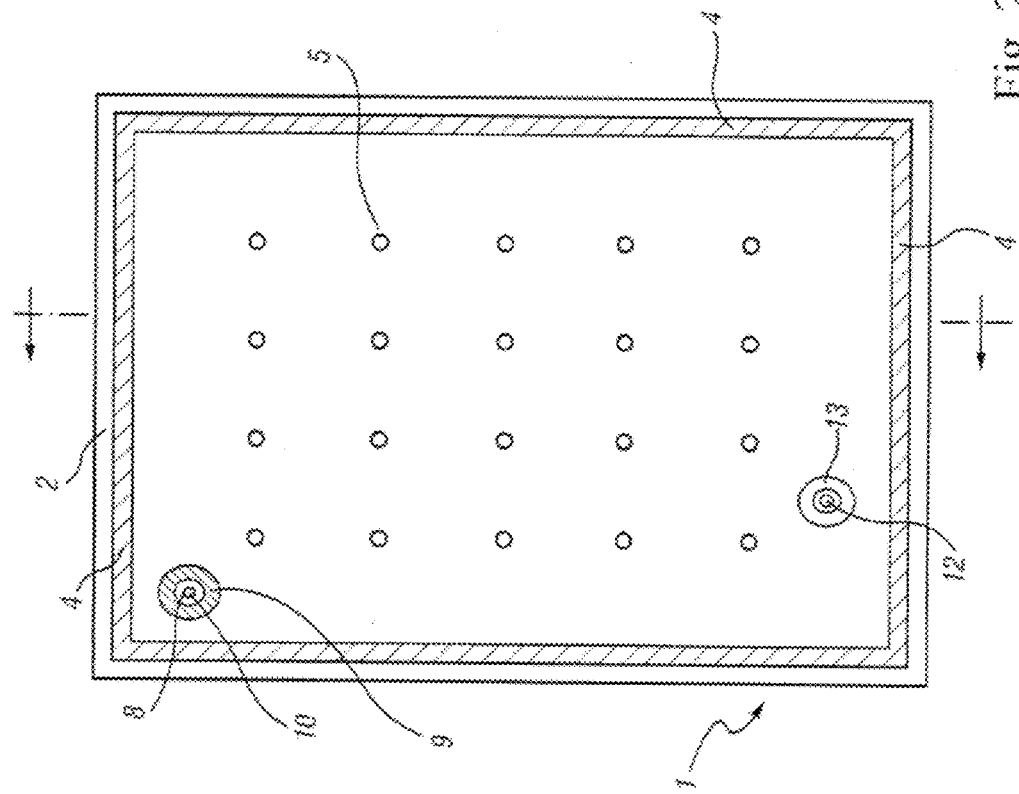
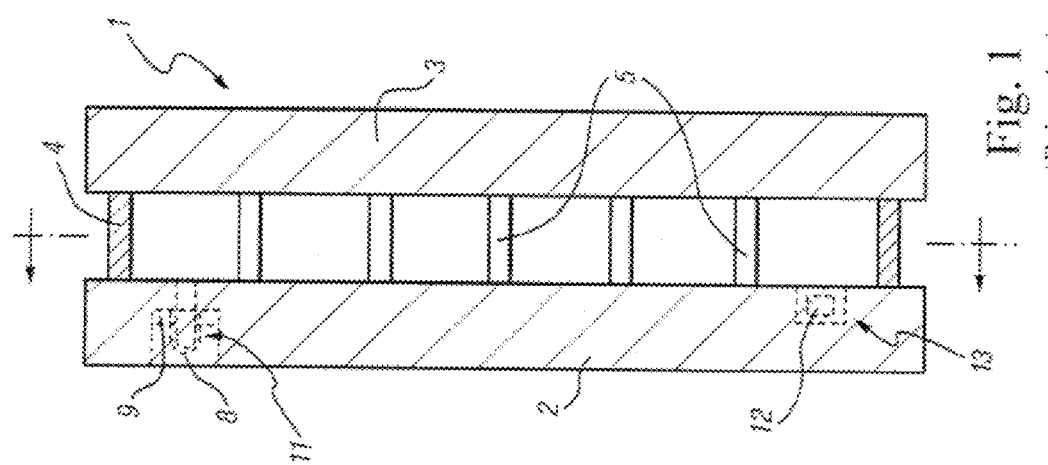

US 9,784,027 B2

VACUUM INSULATING GLASS (VIG) UNIT WITH METALLIC PERIPHERAL EDGE SEAL AND/OR METHODS OF MAKING THE SAME

FIELD OF THE INVENTION

Certain example embodiments of this invention relate to vacuum insulating glass (VIG or vacuum IG) units, and/or methods of making the same. More particularly, certain example embodiments of this invention relate to VIG units having edge seals based on metallic solder pre-form alloys that, when reactively reflowed, wet and bond with metallic coatings pre-coated on the glass substrates' perimeters, and/or associated methods.

BACKGROUND AND SUMMARY OF EXAMPLE EMBODIMENTS OF THE INVENTION

Hermetic sealing of glass substrates to create a vacuum or inert gas environment therebetween is typically made possible using barriers of usually glassy or metallic (e.g., eutectic) materials that are impermeable to ingress of gasses over a long time period, typically many orders of magnitude longer than the device operating lifetime. As will be understood, permeability typically involves two steps. These steps include dissolution and diffusion. Hermetic sealing helps keep, for example, water, other liquids, oxygen and other gaseous contaminant molecules out of packages that hold, for example, and without limitation, a vacuum (e.g., VIG window units, thermos flask, MEMS, and the like), or sensitive materials, such as, for example, and without limitation, organic emitting layers (e.g., used in OLED devices), semiconductor chips, sensors, optical components, or the like, held in an inert atmosphere. Gas tight packaging of the complex interiors of such assemblies has posed obstacles in the later stages of processing of such packages, such as, for example prior to pumping and tip fusing in the case of VIG window units, or last processing steps in the manufacture of OLED devices.

Some example VIG configurations are disclosed, for example, in U.S. Pat. Nos. 5,657,607, 5,664,395, 5,657,607, 5,902,652, 6,506,472 and 6,383,580, the disclosures of which are all hereby incorporated by reference herein in their entireties.

FIGS. 1 and 2 illustrate a typical VIG window unit 1 and elements that form the VIG window unit 1. For example, VIG unit 1 may include two spaced apart substantially parallel glass substrates 2, 3, which enclose an evacuated low-pressure space/cavity 6 therebetween. Glass sheets or substrates 2,3 are interconnected by a peripheral edge seal 4 that may be made of fused solder glass or the like, for example. An array of support pillars/spacers 5 may be included between the glass substrates 2, 3 to maintain the spacing of substrates 2, 3 of the VIG unit 1 in view of the low-pressure space/gap 6 present between the substrates 2, 3.

A pump-out tube 8 may be hermetically sealed by, for example, solder glass 9 or the like to an aperture/hole 10 that passes from an interior surface of one of the glass substrates 2 to the bottom of an optional recess 11 in the exterior surface of the glass substrate 2, or optionally to the exterior surface of the glass substrate 2. A vacuum is attached to pump-out tube 8 to evacuate the interior cavity 6 to a low pressure that is less than atmospheric pressure, for example, using a sequential pump down operation. After evacuation of the cavity 6, a portion (e.g., the tip) of the tube 8 is melted to seal the vacuum in low pressure cavity/space 6. The optional recess 11 may retain the sealed pump-out tube 8. Optionally, a chemical getter 12 may be included within a recess 13 that is disposed in an interior face of one of the glass substrates, e.g., glass substrate 2. The chemical getter 12 may be used to absorb or bind with certain residual impurities that may remain after the cavity 6 is evacuated and sealed. The getter 12 also acts in a manner so as to "mop up" gaseous impurities that may evolve during the environmental weathering of the unit.

VIG units with peripheral hermetic edge seals 4 (e.g., solder glass) are typically manufactured by depositing glass frit or other suitable material in a solution (e.g., frit paste) around the periphery of substrate 2 (or on substrate 3). This glass frit paste ultimately forms the edge seal 4. The other substrate (e.g., 3) is brought down on substrate 2 so as to sandwich spacers/pillars 5 and the glass frit solution between the two substrates 2, 3. The entire assembly including the glass substrates 2, 3, the spacers/pillars 5 and the seal material (e.g., glass frit in solution or paste), is then typically heated to a temperature of at least about 500° C., at which point the glass frit melts, wets the surfaces of the glass substrates 2, 3, and ultimately forms a hermetic peripheral/edge seal 4.

After formation of the edge seal 4 between the substrates, a vacuum is drawn via the pump-out tube 8 to form low pressure space/cavity 6 between the substrates 2, 3. The pressure in space/cavity 6 may be produced by way of an evacuation process to a level below atmospheric pressure, e.g., below about $10^{-4}$ Torr. To maintain the low pressure in the space/cavity 6, substrates 2, 3 are hermetically sealed via the edge seal and sealing off of the pump-out tube. Small high strength spacers/pillars 5 are provided between the transparent glass substrates to maintain separation of the approximately parallel glass substrates against atmospheric pressure. As noted above, once the space 6 between substrates 2, 3 is evacuated, the pump-out tube 8 may be sealed, for example, by melting its tip using a laser or the like.

High-temperature bonding techniques such as, for example, anodic bonding and glass frit bonding, as discussed above, have been widely used method for hermetically sealing (e.g., forming an edge seal) components made of silicon, ceramics, glass, or the like. The heat required for these high-temperature processes is typically in the range of about 300-600 degrees C. These conventional bonding techniques typically require oven-intensive bulk heating in which the entire device (including the glass and any components housed within the glass housing) comes to near thermal equilibrium with the oven for a seal to form. As a result, a relatively long period of time is required to achieve an acceptable seal. For example, as the device size L increases, the sealing time may typically increase on the order of $L^3$. It is also the case that the most temperature sensitive component determines the maximum allowable temperature of the entire system. Thus, high-temperature sealing processes discussed above (e.g., anodic bonding and glass frit bonding) are not suitable for fabricating heat-sensitive components such as, for example, tempered VIG units and encapsulating sensitive components, such as, for example, OLED devices. In the case of tempered VIG units, the thermally tempered glass substrates of a VIG unit would rapidly lose temper strength in the high-temperature environment. In the case of an example OLED package, certain functional organic layers would be destroyed at temperatures of 300-600 degrees C. (sometimes even as low as 100° C.). In the past, one way to address this with high-temperature bulk sealing processes was to develop lower temperature frits, while still using bulk thermal equilibrium heating processes.

By way of background, glass frits and/or solders are typically mixtures of glass material and metallic oxides. Glass composition may be tailored to match the coefficient of thermal expansion (CTE) of the bonding substrates. Lead-based glasses are the most common bonding/sealing material/technique used commercially in cathode ray tubes (CRT), plasma displays and VIG window units. Lead-based glass frits are also among the least permeable glass sealing materials. Traditionally, these solders are based on glassy materials and de-vitrification is suppressed.

Glass frits or solders are typically made up of a base glass, a refractory filler and a vehicle. The base glass forms the bulk of the frit or solder. The filler reduces the CTE as well as matching it to the glass substrates to be joined. This matching enhances the mechanical strength, reduces interfacial stress and improves the crack resistance of the seal. The vehicle is typically made of a solvent (with surfactants) that provides fluidity for screen printing (e.g., for dispensing into gaps to be sealed and/or onto a surface to be sealed) and an organic binder.

Among the advantages of these types of glass frits or solders is that they include a relatively low melting point (e.g., in a range of about 480-520 degrees C.) glass that will stick to most semiconductor materials, including, but not limited to, glass, silicon, silicon oxide, most metals and ceramics, making bonding techniques using these types of materials versatile and widely accepted.

There are many different types of commercially available glass frit materials having various melting points, CTEs, binders, and screen printing properties. However, almost all lower melting point formulations of glass frit or solder contain some lead. This may potentially become a drawback, as the U.S., EU, and Japan, for example, are severely limiting, if not forbidding, the use of lead in electronics manufacturing in the coming years. In the last few years, frits or solders based on bismuth oxides have had some success in replacing lead based frits, however the melting temperature (Tg) of these types of frits is still typically above about 450 degrees C. As with lead based frits, these bismuth oxide based frits cannot be used for fabrication of temperature sensitive devices using conventional oven bulk heating processes. Lower Tg (e.g., 375-390 degrees C.) frits based on vanadium barium zinc oxides (VBZ) have also been developed, including, but not limited to, VBaZn, V phosphates, $SnZnPO_4$. However, widespread usage of these types of frits has been limited. Moreover, although such glass fits are an improvement over conventional approaches, they sometimes still have difficulties meeting stringent thermo-mechanical requirement of a low temperature all-glass peripheral seal. This is caused in part because low temperature glass solders usually are made of large ionic radii species do not readily diffuse into the glass surface at low processing temperatures and times.

Of course, it also will be appreciated that it would be desirable to provide VIG units capable of surviving harsh environments, e.g., those typically characterized by high operational temperatures, as well as exposure to shocks and vibrations, humidity, contaminants, radiation, and/or the like. For instance, the glazing industry subject materials to harsh environments with each extreme use posing its own challenges. For example, in skylights, glazing systems are subjected to extreme temperatures (150 degrees C.) and shocks and vibration loading related to wind loads. Indeed, ambient temperature near the VIG seal can reach in excess of 150 degrees C. with shock and vibration loading, and the ambient temperature in a building facade can be as high as 200 degrees C. Thus, it is challenging to provide an edge seal that provides long-term hermeticity, mechanical strength, and low possible thermal pathways.

Thus, it will be appreciated there is a need in the art for a seal processing technique that does not involve heating the entire article to be sealed to high temperature(s), and/or articles made in such example manners.

In certain example embodiments of this invention, a method of making a VIG unit is provided. Nickel-inclusive thin film coatings are formed around peripheral edges of first major surfaces of first and second substrates. Spacers are placed on the first major surface of the first substrate. A solid (metallic) solder pre-form alloy material is placed over and contacting the nickel-inclusive thin film coating formed on the first major surface of the first substrate. The first and second substrates are brought together such that the first major surfaces thereof face one another to form a subassembly. An edge seal is formed, in vacuo, by reactively reflowing the solid solder pre-form alloy material, such that nickel from the nickel-inclusive thin film coatings diffuses into the alloy material and vice versa. Following the formation of the edge seal, which then includes inter-metallic compounds, a cavity formed between the first and second substrates is further evacuated in making the VIG unit. The solid solder pre-form alloy material includes Sn and at least one other material selected from the group consisting of post-transition metals or metalloids; Zintl anions from group 13, 14, 15 or 16; and transition metals. The solid solder pre-form alloy material preferably excludes Pb.

In certain example embodiments of this invention, a method of making a VIG unit is provided. Metallic, nickel-inclusive thin film coatings are formed around peripheral edges of first major surfaces of first and second substrates. Spacers are placed on the first major surface of the first substrate. A solder pre-form is placed over and contacting the nickel-inclusive thin film coating formed on the first major surface of the first substrate. The first and second substrates are brought together such that the first major surfaces thereof face one another to form a subassembly. The subassembly is heated to a peak temperature of no more than 250 degrees C. and in an atmosphere less than atmospheric in order to reflow the solder pre-form and form an edge seal. Following the formation of the edge seal, a cavity formed between the first and second substrates is further evacuated in making the VIG unit.

In certain example embodiments of this invention, VIG units made using these and/or other methods a provided. For example, in certain example embodiments of this invention, a VIG unit comprises: first and second substantially parallel spaced apart substrates, with at least one of the first and second substrates being a heat treated glass substrate; a plurality of spacers provided between the first and second substrates; and an edge seal comprising an alloy material including Sn and at least one other material selected from the group consisting of post-transition metals or metalloids; Zintl anions from group 13, 14, 15 or 16; and transition metals and, on each side thereof and in order moving away from the alloy material and towards the first and second substrates, respectively, at least one inter-metallic (IMC) layer and a nickel-inclusive layer.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which:

FIG. 1 is a cross-sectional view of a conventional vacuum IG unit;

FIG. 2 top plan view of the bottom substrate, edge seal, and spacers of the FIG. 1 vacuum insulating glass (VIG) unit taken along the section line illustrated in FIG. 1;

DETAILED DESCRIPTION OF EXAMPLE EMBODIMENTS OF THE INVENTION

Figure 3:
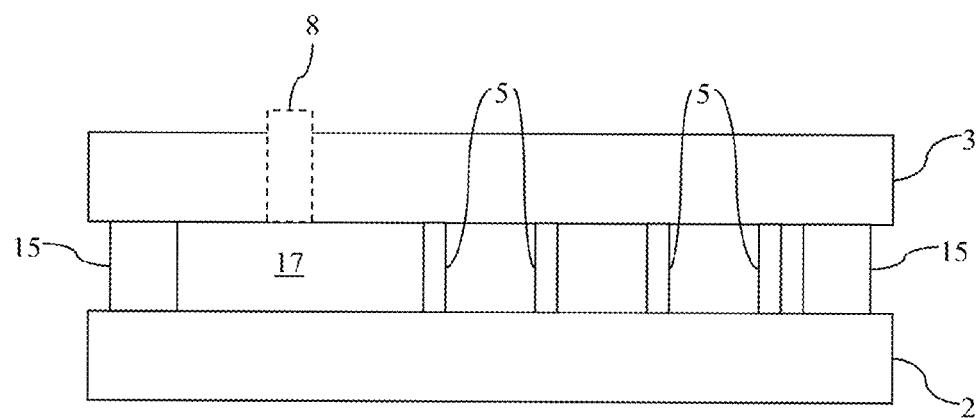
FIG. 3 is a cross-sectional view of a VIG unit according to certain example embodiments.

Certain example embodiments relate to a vacuum insulating glass (VIG) unit provided with a metal-inclusive peripheral edge hermetic seal, and/or methods of making the same. The primary material used in forming the edge seal is based on a metallic solder pre-form alloy that, when reactively reflowed, wets a metallic coating pre-coated on the glass substrates' perimeters. The use of these techniques advantageously permit low processing temperatures, e.g., through the careful selection of solder-coating combinations. This may in certain example embodiments advantageously allow thermally tempered glass to be used in VIG units without significantly sacrificing the temper strength of the glass during the fabrication process, permit sputtered soft low emissivity (low-E) coatings to be used, enable thin film getter materials to be provided, etc. In certain example embodiments, it advantageously becomes possible to form a vacuum without the use of a pump-out tube or the like.

More particularly, certain example embodiments relate to alloys based on Sn, post-transition metals or metalloids from Group 13, 14, 15, or 16, and Zintl anions, as well as transition metal dopants, that (a) readily wet the coated glass, (b) have the desirable rheological properties in terms of forming a seal at temperatures that will not de-temper glass and/or decompose a laminate, and/or (c) remain hermetic and lack a porous structure in its bulk. A thin film coating on glass may in certain example embodiments work with the Sn-based inter-metallic solder material to form robust and durable hermetic interfaces. By energizing the seal appropriately, it is possible to reduce the presence of bubbles (e.g., micro-bubbles), voids, and/or other defects in the seal. And because the process is a low temperature process, certain example embodiments can use compliant and visco-elastic spacer (e.g., pillar) technology based on naturally occurring lamellar polymeric structures (e.g., of the de Gennes class).

One aspect of certain example embodiments relates to the development and use of a new class of alloys based on metal and metalloid solder materials that readily wet the glass and have rheological properties sufficient to form a seal at temperatures that will not de-temper glass and will not decompose a laminate, while the formed steal is hermetic and lacks a porous structure in its bulk.

Another aspect of certain example embodiments relates to the development and use of a thin film coating or layer stack provided on the glass substrates that, together with the solder, forms robust and durable interfaces that are hermetic. The thin film coating or layer stack preferably is reactively wetted and inter-mixed in a very short time by the metal solder.

Another aspect of certain example embodiments relates to the development and use of electrical and/or radiation means (e.g., radiant heat, forced convective heating, and inductive as well as resistive heating, etc.) of energizing the seal, potentially in-vacuo, to form a homogeneous seal structure that lacks bubbles and defects. A combination of such means of energizing the seal formation in a time that limits the formation of an inter-metallic compound (IMC) has been found to be advantageous in achieving and/or maintaining hermeticity.

Still another aspect of certain example embodiments relates to the development and use of compliant and visco-elastic spacer/pillar technology, e.g., based on naturally occurring lamellar structures (such as, for example, of the de Gennes class).

In certain example embodiments, these example aspects can be combined in any suitable combination or sub-combination.

Advantageously, certain example embodiments may have a higher R-value or lower U-value than what is currently attainable, e.g., because the low temperature process may allow for compliant and thermally insulating spacers/pillars that may, for instance, be spaced further apart.

In certain example embodiments, the process, including the sealing process, preferably does not exceed 350 degrees C., more preferably does not exceed 300 degrees C., and still more preferably does not exceed 250 degrees C.

Referring now more particularly to the drawings in which like reference numerals indicate like parts throughout the several views, FIG. 3 is a cross-sectional view of a VIG unit according to certain example embodiments. It will be appreciated that the FIG. 3 example embodiment is similar to that shown in connection with FIGS. 1-2. For instance, first and second substrates (e.g., glass substrates) 2 and 3 are provided in substantially parallel spaced apart relation to one another. A plurality of spacers (e.g., pillars or the like) 5 help maintain the first and second substrates 2 and 3 in this orientation. A pump-out port 8 is provided in this example embodiment; however, as will be described in greater detail below, certain example embodiments may form a vacuum in the cavity 17 without the presence of such a port 8.

Figure 4:
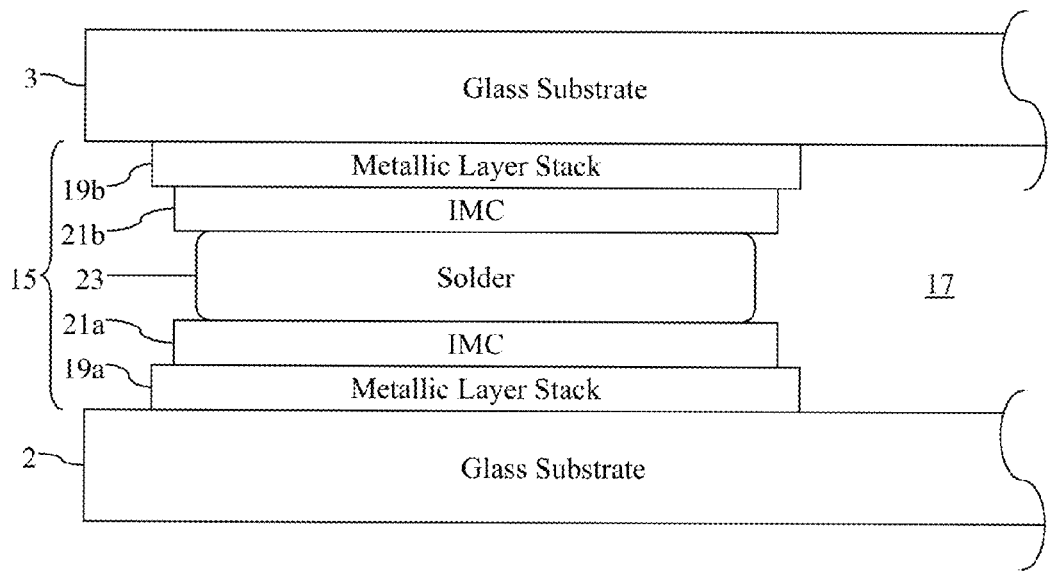
FIG. 4 is an enlarged view of an end-portion of FIG. 3, in accordance with certain example embodiments.

The FIG. 3 example embodiment differs from the VIG unit shown in FIGS. 1-2 in that it includes an improved edge seal 15. More particularly, the improved edge seal 15 is based on a metallic solder pre-form alloy that, when reactively reflowed, wets metallic coatings pre-coated on the glass substrates, e.g., at peripheral edges thereof. In this regard, FIG. 4 is an enlarged view of an end-portion of FIG. 3, in accordance with certain example embodiments. First and second metallic layer stacks 19a and 19b are respectively provided on the first and second substrates 2 and 3. A solder pre-form is melted and forms a band of solder 23 that comprises the bulk of the seal, at least in terms of volume.

The solder 23 is bonded with the first and second metallic layer stacks 19a and 19b via first and second inter-metallic compounds (IMCs) 21a and 21b, respectively. As will be described in greater detail below, the edge seal 15 may be formed under vacuum conditions and provide a good hermetic seal.

Figure 5:
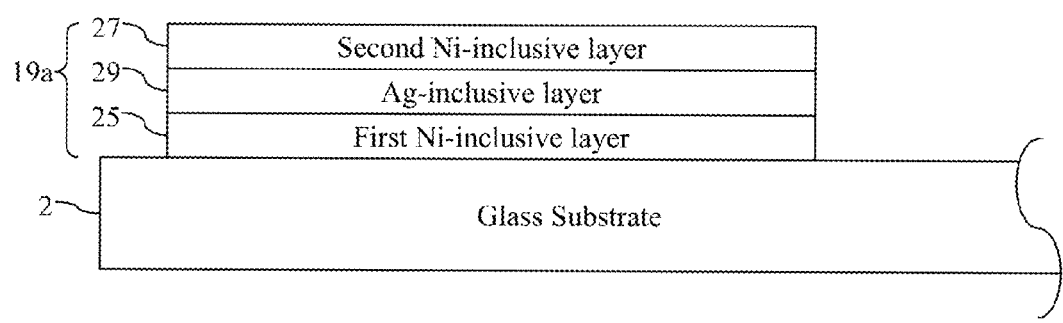
FIG. 5 is an enlarged view of the metallic layer stack disposed on the first substrate, as shown in FIG. 4, in accordance with certain example embodiments.

FIG. 5 is an enlarged view of the first metallic layer stack 19a disposed on the first substrate 2, as shown in FIG. 4, in accordance with certain example embodiments. As can be seen from the FIG. 5 example, the first metallic layer stack 19a includes first and second nickel-inclusive layers 25 and 27 sandwiching a silver-based layer 29. The nickel-inclusive layers 25, 27 may comprise, consist essentially of, or consist of metallic Ni, NiCr, NiTi, NiV, NiW, and/or the like. In certain example embodiments, the composition of the first and second nickel-inclusive layers 25 and 27 may be same. The amount of nickel in each of the first and second nickel-inclusive layers 25 and 27 preferably is at least about 60%, more preferably is at least about 70%, and still more preferably is at least about 80%. Example compositions include 80/20 and 90/10 NiCr, NiTi, and the like.

The thin-film layers shown in FIG. 5 may be formed via any suitable technique such as, for example, e-beam deposition, sputtering, and/or the like. For instance, a NiCr/Ag/NiCr layer stack may be formed via physical vapor deposition (PVD), e.g., in an inert atmosphere including nitrogen, argon, and/or the like. It also will be appreciated that this example layer stack may be formed using electrolytic techniques (e.g., similar to those used in mirror processes), selectively at the perimeter(s) of the substrates. The presence of Ni may in certain example embodiments help provide for good wettability, while also serving as a diffusion barrier (e.g., trapping Si, Na, and/or the like from the underlying substrate), and forming an extremely strong Ni-Silicide bond with the glass. It will be appreciated that other metallic layer stacks may be used in connection with different example embodiments, e.g., to match the content of the solder material, and may be applied via any suitable technique.

Layers 25 and 27 preferably have a thickness of 10 nm to 5 microns, more preferably 20 nm to 3 microns, and still more preferably 50 nm to 1 micron. Layer 29 preferably has a thickness of 10 nm to 2 microns, more preferably 50 nm to 1 micron, and still more preferably 100 nm to 500 nm or 1 micron. Example thicknesses for the layers in the NiCr/Ag/NiCr layer stack are 50 nm, 100 nm, and 50 nm, respectively.

Although layers 25 and 27 are described as being nickel-inclusive, it will be appreciated that copper may be used in place of, or together with nickel, in certain example embodiments. It has been found that both nickel-inclusive and copper-inclusive metallic layers adhere well to the glass and match well with a solder pre-form based on an alloy of tin, silver, and copper. Further details concerning the example solder pre-form of certain example embodiments are provided below. Although certain example embodiments are described in connection with wire pre-forms, it will be appreciated that other pre-forms (e.g., tape pre-forms) may be used in place of, or together with, such wire pre-forms.

Figure 6:
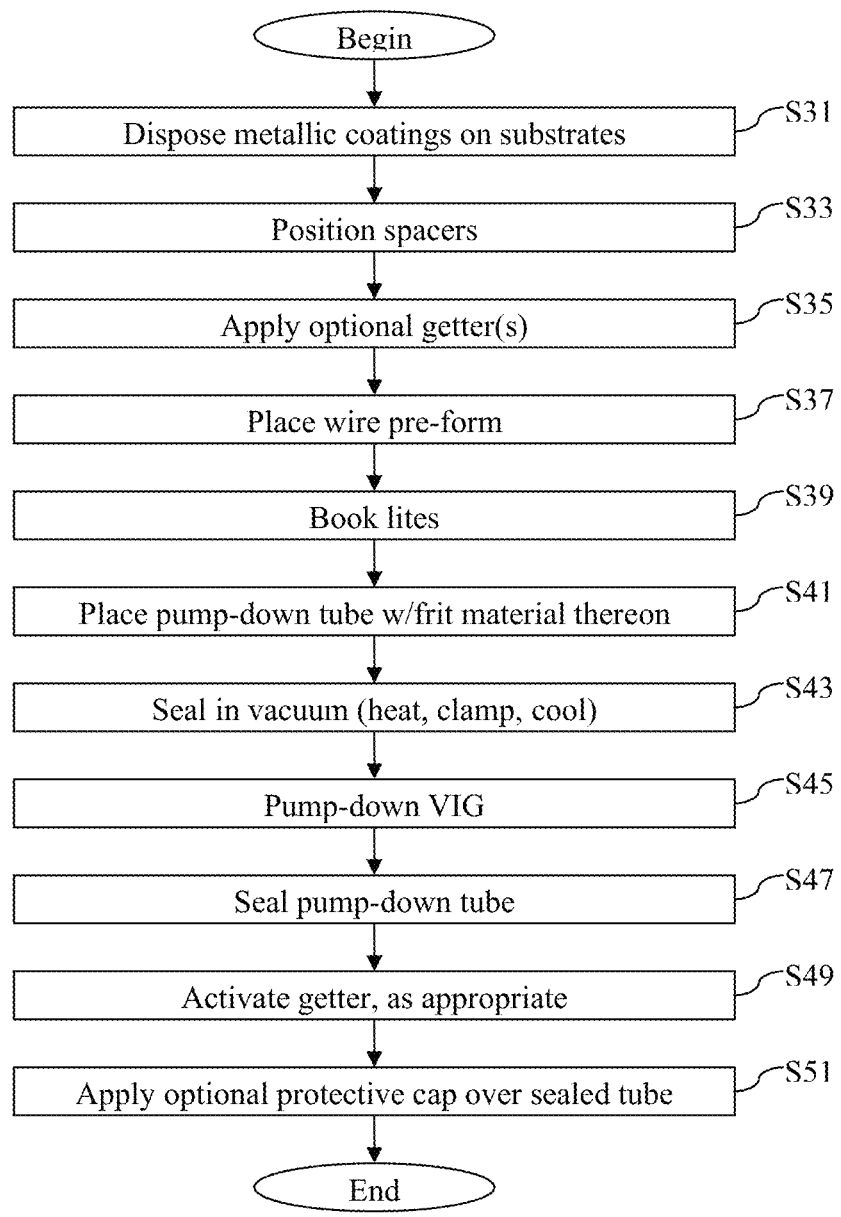
FIG. 6 is a flowchart illustrating a process for making a VIG unit in accordance with certain example embodiments.

FIG. 6 is a flowchart illustrating a process for making a VIG unit in accordance with certain example embodiments. It will be appreciated that one or more preparatory operations (not shown in FIG. 6) may be performed in certain example embodiments. For example, the substrates may be cut to size and/or edge seamed. A hole for accommodating the pump-out port, a getter-holding pocket, and/or the like, may be drilled. When glass substrates are used, the substrates may be heat treated (e.g., heat strengthened and/or thermally tempered), chemically tempered, etc. Heat treatment may be performed after sizing, drilling, and/or other operations. Thin film and/or other coatings may be formed on the substrates, as well. For instance, low emissivity (low-E), antireflective, and/or other coatings may be formed on the substrates. Decorative coatings may be screen printed, ink jet printed, and/or otherwise formed, in addition or as an alternative. In any event, if such coatings are heat treatable and the substrates are to be heat treated, they may be blanket coated on stock substrates prior to this heat treatment. If such coatings are not heat treatable and the substrates are to be heat treated, they may be formed on the sized and/or otherwise processed substrates. If the substrates will not be heat treated, the coatings may be formed at any suitable time, e.g., they may be blanket coated and/or applied to coatings after sizing and/or other operations. If a coating is, or coatings are, formed on the substrate(s), edge deletion may be performed, e.g., in the area proximate to where the edge seal is to be formed. The substrates may be cleaned (e.g., using DI water, plasma ashing, and/or the like). In certain example embodiments, pre-roughening of the glass and/or edge deletion in areas proximate to where the seal is to be formed is unnecessary.

Once the substrates are suitably prepared and properly oriented, a metallic coating (e.g., of the type shown in and described in connection with FIG. 5) may be formed around the peripheral edges of the substrates as shown in step S31 of FIG. 6. As indicated above, any suitable technique may be used to "nickelize" or otherwise treat the substrates. For instance, localized PVD may be used to create a three-layer thin film coating with a layer of or including Ag sandwiched between layers comprising Ni (e.g., NiCr), Cu, and/or the like. The coatings may be provided around the peripheral edges of the substrates at a width that is at least as wide as the solder when it is melted.

As indicated in step S33, spacers may be provided on the first substrate. The spacers may be substantially columnar pillars, cushion-shaped spacers, and/or the like. They may be glass pillars, formed from mica, a polymer, laminated pillars, and/or any other suitable material or material combination. The spacers disclosed in U.S. Pat. No. 6,946,171 and/or U.S. Publication No. 2013/0136875 may be used in these regards. The entire contents of each of these patent documents is hereby incorporated by reference herein. In this regard, because lower temperature processes are involved in the fabrication of the VIG unit, a potentially broader spectrum of materials for the spacers becomes available. Softer spacers will "dig into" the glass less than their harder counterparts, thereby producing less stress (e.g., based on Hertzian forces) at such locations. As a result, it is possible to move the pillars or other structures farther apart. The ability to use different materials for the spacers and to locate them farther apart can advantageously improve the aesthetics of the unit and/or also potentially reduce thermal conductivity through the VIG unit.

Optionally, getter material(s) may be applied (e.g., in previously formed pockets, as blanket coatings, etc.). Getter materials and activation techniques are disclosed in, for example, U.S. Ser. Nos. 13/562,386; 13/562,408; 13/562,423, each filed on Jul. 31, 2012, the entire contents of each of which are hereby incorporated by reference herein. These and/or other getters may be used in connection with certain example embodiments. In certain example embodiments, a getter material including barium and/or zirconium, for example, may be blanket coated on a substrate, e.g., via e-beam evaporation and/or the like. Because the blanketed getter is provided over a large surface area, only a few angstroms of material may be needed to perform typical getter chemical getter functions. In certain example embodiments, the blanket may be less than 20 angstroms thick, more preferably less than 10 angstroms thick, and possibly 5 angstroms thick or even less. In this vein, the getter may be continuously or discontinuously on the substrate. Where blanketed getter is provided, it may be desirable to apply such materials prior the formation of the metallic coatings mentioned in connection with step S31.

In step S37, a wire pre-form or the like is provided around the peripheral edges of the substrate. In certain example embodiments, the wire pre-form may be bent into the desired configuration in one or more steps not shown. Alternatively, or in addition, the wire pre-form may be pieced together from multiple smaller sections. For instance, wires may be soldered end-to-end, laser-welded together, and/or the like.

As alluded to above, the solder pre-form may be an alloy of or including tin, silver, and copper. The solder pre-form preferably is lead-free. For instance, SAC305, SAC0307, and/or the like may be used in connection with certain example embodiments. SAC305 is a lead-free alloy that contains 96.5% tin, 3% silver, and 0.5% copper, and SAC0307 is a lead-free alloy that contains 99% tin, 0.3% silver, and 0.7% copper. In certain example embodiments, a solder paste of the same or similar composition may be provided in place of, or in addition to, a wire pre-form.

It is noted that lower-silver content SAC alloys such as, for example, SAC105, may be desirable in applications where shocks and vibrations are of concern. However, increasing the silver content can in some instances help to reduce the creep rate of SAC solders, thereby increasing reliability when subjected to temperature aging and/or the like. Thus, higher-silver content SAC alloys such as, for example, SAC405, may be desirable in high temperature applications. Alloys such as SAC305, SAC0307, etc., may be good "compromises" that provide desirable resistance to shocks and vibrations, while still providing good survivability for many high temperature related applications. It also is noted that other alloys in the phase space around and/or between these eutectic alloys may be used in different example embodiments.

The lites are booked together in step S39, and a pump-out tube with frit material thereon may be placed in a pre-drilled hole in step S41.

Optionally, a tape or other adhesive material may be used to help hold this subassembly together during further processing. Any polyimide, polyamide, acrylic, and/or other tape or adhesive material may be used to form a temporary seal. For instance, Kapton, Acrylite, and/or other tapes may be used in certain example embodiments.

Sealing may take place in vacuo, as indicated in step S43. The sealing may include, for example, heating to reflow the solder, the application of static pressure (e.g., via mechanical clamping and/or the like) during bond solidification, and a process in which the subassembly is cooled and/or allowed to cool. Dynamic pressure alternatively or additionally may be used in certain example embodiments. This initial vacuum preferably is less than 1 Torr, more preferably less than 0.5 Torr, and sometimes less than 0.1 Torr. It will be appreciated that an initial inert gas environment also may be used in connection with such operations in certain example embodiments.

Heating may be performed to a peak temperature sufficient to cause the solder to reflow but preferably does not exceed 350 degrees C., more preferably does not exceed 300 degrees C., and still more preferably does not exceed 240-250 degrees C. In certain example embodiments, the peak temperature is just above the isopleth temperature of the solder. For instance, in certain example embodiments, the peak temperature preferably is less than 50 degrees C. above the isopleth temperature, more preferably 20-40 degrees C. above isopleth temperature. As an example, the peak temperature may be about 40 degrees above the isopleth temperature, which may correspond to about 240-250 degrees C. in some instances. The heating may be performed for several minutes to several hours. Preferably, the heating is performed for 1 minutes to 2 hours, more preferably 5-60 minutes, and sometimes from 10-30 minutes.

Figures 8A, 8B:
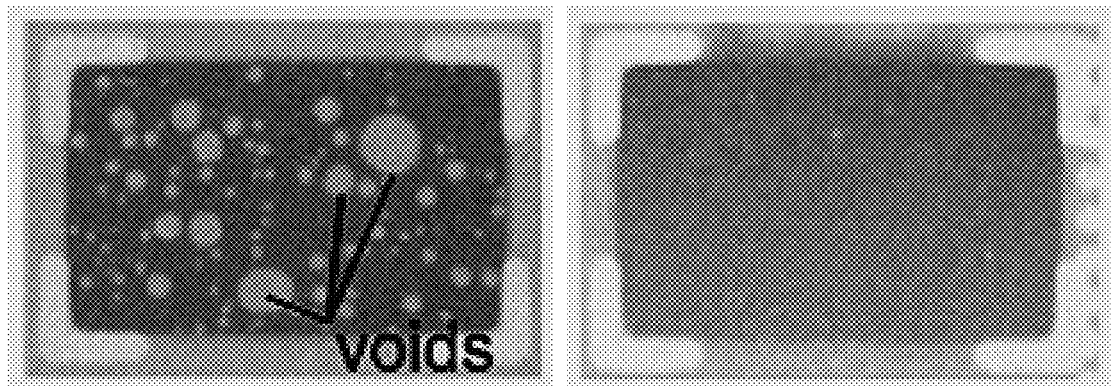
FIGS. 8a-8b are cross-sectional micrographs of an example SnAgCu metal seal structure.

Reflowing of the solder creates bubbles. The bubbles could become trapped in the edge seal and degrade the seal quality (e.g., by compromising its structural integrity and hermetic sealing properties) by, for example, leaving voids and/or the like in the fired seal. However, heating under vacuum conditions advantageously helps address these concerns. For example, heating under vacuum conditions in essence helps to suck the bubbles out during the reflowing process. In this regard, FIGS. 8a-8b are cross-sectional micrographs of an example SnAgCu metal seal structure. More particularly, FIG. 8a clearly shows the presence of voids after a partial vacuum of $10^{-2}$ Torr is reached. By contrast, FIG. 8b shows a lack of significant voids when the seal is completely formed and the VIG unit is under full vacuum. Although vacuum heating is preferable, an inert gas atmosphere can also be used during the reflow process.

A wire perform of about 1 mm in width expands (e.g., in some instances up to about 10 mm or sometimes even more). Nickel from the metallic coating diffuses into the solder, and vice versa. This reflowing process thus is reactive in certain example embodiments, in that several layers of materials that make up the hermetic seal are created, and these layers have been found to be very smooth. New phases of nickel are created. The bottom layer of material closest to the nickel in the metallic layer stack has been characterized generally as $(Ni_xCu_{1-x})_3Sn_4$, and the top layer closest to the reflowed SAC solder has been characterized generally as $(Cu_yNi_{1-y})_6Sn_5$. The IMC layers 21a and 21b in FIG. 4 may comprise at least these two layers in certain example embodiments. In certain example embodiments, the layer stack of or including glass/NiCr/Ag/NiCr/SnAg$_{3\%}$Cu$_{0.5\%}$, e.g., as shown in and described in connection with FIG. 5, is transformed into a layer stack of or including glass/NiCrO$_x$:Si/(Ni$_x$Cu$_{1-x}$)$_3$Sn$_4$/(Cu$_y$Ni$_{1-y}$)$_6$Sn$_5$/SAC. In other words, in certain example embodiments, the first and second metallic layer stacks 19a and 19b may be transformed from a NiCr/Ag/NiCr layer stack into a layer of or including NiCrO$_x$:Si, with the Si being leached from the underlying substrate and/or the oxygen entering during the pump-down, for example. It will be appreciated that the seal in certain example embodiments provides an improved thermal break between the glass substrates and, as a result, advantageously results in reduced thermal conductivity.

Figure 7A:
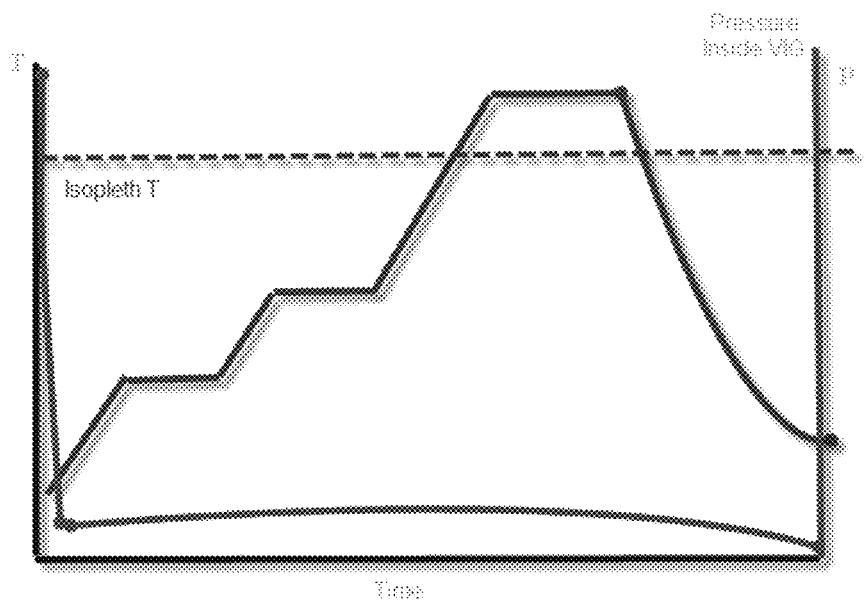
FIG. 7a is a graph showing an example temperature and pressure profile that may be used in connection with the pump-down of certain example embodiments.
Figure 7B:
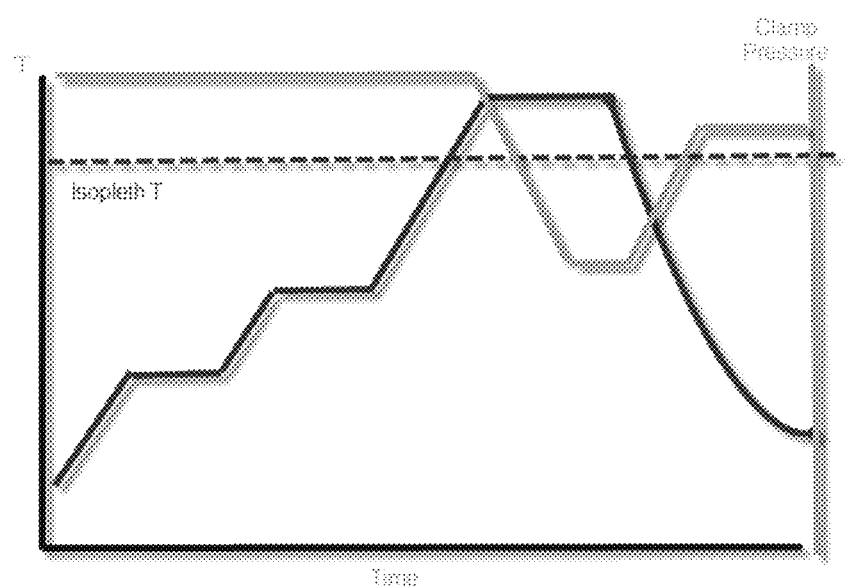
FIG. 7b is a graph showing example temperature and clamp pressure sequence curves that may be used in connection with certain example embodiments.

Pump-down may be performed in step S45, e.g., using the pump-down tube. The pressure within the cavity may be pumped down to $10^{-6}$ Torr in certain example embodiments. In other example embodiments, pump-down may be accomplished without using a tube. FIG. 7a is a graph showing an example temperature and pressure profile that may be used in connection with the pump-down of certain example embodiments. The pressure is measured inside the subassembly in the FIG. 7a example. As shown in FIG. 7a, the peak temperature is just above the isopleth temperature. The pressure may decrease quite rapidly but might in some instances thereafter experience a slow pressure increase and slow pressure decrease, e.g., as bubbles are formed and as outgassing takes place. In some instances, such a perturbation may develop and taper quite rapidly. It will be appreciated that other temperature and/or pressure profiles inside the subassembly may be used in connection with different example embodiments, and that that which is shown in FIG. 7a is just one example. FIG. 7b is a graph showing example temperature and clamp pressure sequence curves that may be used in connection with certain example embodiments. It will be appreciated that other temperature and/or clamp pressure profiles may be used in connection with different example embodiments.

If provided, the tube may be sealed in step S47. This may be performed using the pump-out tube tip-off techniques described in connection with U.S. Publication Nos. 2013/0153550 and/or 2013/0153551, and/or U.S. application Ser. No. 13/628,653, filed Sep. 27, 2012, the entire contents of each of which are hereby incorporated by reference herein.

If a getter is provided in a pocket, then the getter may be activated, as indicated in step S49. Additionally, or alternatively, if a getter is blanket coated on a substrate, the heat associated with the sealing may be sufficient to activate the getter.

It is noted that the cavity may be cleaned in connection with plasma-enhanced evacuation techniques and a static plasma grid or array, e.g., as set forth in U.S. Publication No. 2012/0304696, the entire contents of which are hereby incorporated by reference herein. Ozone cleaning techniques also may be used, e.g., as discussed in U.S. Publication No. 2013/0292000, the entire contents of which are hereby incorporated by reference herein.

The pump-out tube may have an optional protective cap applied over it, e.g., as noted in step S51. There are a variety of techniques that may be used to protect the pump-out tube and that may be used in connection with certain example embodiments. See, for example, U.S. Publication Nos. 2013/0074445, 2013/0302542, 2013/0305785, 2013/0306222, and 2013/0309425, the entire contents of each of which are hereby incorporated by reference herein.

In certain example embodiments, an optional secondary, non-hermetic peripheral seal may be provided. The seal may be a peripheral polymeric seal in certain example embodiments, and it may, for example, comprise silicone, polyamide, PIB, and/or the like. It may in some instances help to protect the hermetic edge seal that it at least partially encapsulates.

When tempered glass is used, preferably at least 70% of temper strength remains in the finished VIG unit, more preferably at least 75% of temper strength remains in the finished VIG unit, still more preferably at least 85% of temper strength remains in the finished VIG unit, and still more preferably at least 95% of temper strength remains in the finished VIG unit.

Figure 9:
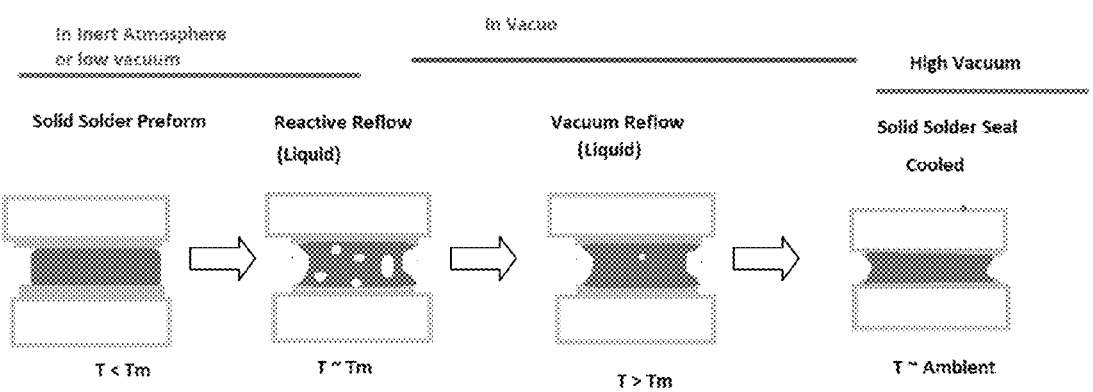
FIG. 9 is a schematic diagram illustrating an example solder seal formation process that may take place in certain example embodiments.

FIG. 9 is a schematic diagram illustrating an example solder seal formation process that may take place in certain example embodiments. As shown in FIG. 9, the subassembly with the solid solder pre-form sandwiched between the thin film coatings supported by the opposing first and second substrates is inserted into an inert atmosphere and/or low vacuum environment. Because the temperature of the solder pre-form is less than the melting temperature, the solder pre-form is sold. However, as the temperature is increased and the temperature is at about the melting temperature of the solder pre-form, reactive reflow begins. Voids, bubbles, etc., form in the now liquid or liqidous solder, and the thin film coatings begin to dissolve into the solder, and vice versa. The subassembly is moved into vacuum conditions and the temperature exceeds the melting temperature of the solder. The bubbles in the liquid solder are in large part removed from the solder, e.g., in the vacuum reflow operation. Diffusion of the thin film coatings into the solder, and vice versa, continues. The thin film coatings may also at least partially dissolve into the substrate, and/or vice versa. The solder is cooled and/or allowed to cool at high vacuum, and the temperature is returned to ambient, completing formation of the hermetic seal. It will of course be appreciated that static and/or dynamic pressure applications are not shown in FIG. 9 but may be used in this example process. It also will be appreciated that this is one schematic view of how the sealing operations may take place, and other processing flows may be used in place of, or together with, those shown in the FIG. 9 example.

It will be appreciated from the above that certain example embodiments involve coating the surface of the glass with a metallic layer stack (MLS). The solder joint creation technique of certain example embodiments involves inter-metallic reactions at the surface of the MLS and the solder bulk in order to establish a strong bond, and forming a thin inter-metallic layer during solder reflow. This inter-metallic layer is stronger but more brittle than the bulk solder. Therefore, the increasing thickness of the interfacial IMC layer too far can be deemed detrimental to reliability under mechanical stresses. It has been observed that diffusion, occurring more rapidly at higher temperatures, can cause the interfacial inter-metallic layers at the interfaces to grow more quickly as a function of time. However, the reliability of solders at elevated temperatures may in some instances be increased by suppressing the growth of the inter-metallic layer at the underlying metallic layer stack interface. The paragraphs that follow help characterize IMC layer growth and discuss factors that can be used to tune IMC layer growth, etc., to result in high quality seals in certain example instances.

The thickness of the IMC layer may depend on factors, such as, for example, temperature, time, volume of solder, property of the solder alloy, morphology of the deposit, etc. And as noted above, inter-metallic layers grow as a function of time and also tend to grow faster at elevated temperatures. Holding the peak temperature during reflow for longer durations can increase the initial inter-metallic layer thickness and change its morphology. Therefore, shorter peak temperatures may be advantageous in certain instances.

Inter-metallic layers may grow failure locations that can move into interfacial inter-metallic layers, which can in some instances be attributed to the weaker interfaces between inter-metallic layers and bulk solder, as well as the high modulus of elasticity of inter-metallic compounds increasing the stress in those layers. The presence of voids that occur as a result of diffusion of Sn away from the interface during aging at high temperatures can reduce the strength of the bond. Silver related inter-metallic layers, e.g., $Ag_3Sn$, can form in the bulk solder and can migrate towards interfaces over time. Increasing the concentration of silver within the solder alloys can create larger $Ag_3Sn$ platelets and large needles in the bulk solder that tend to be brittle and can initiate fractures. Thus, the amount of silver can be tuned to provide better long-term seals. In some instances, solder joints with less than 3.5 wt. % silver may reduce the formation of large $Ag_3Sn$ inter-metallic layers. In some instances, a solder alloy composition with less than 1.2 wt. % silver can be advantageous in terms of seal quality.

It also is believed that the inter-metallic growth rate for solid-liquid couples is significantly faster compared with growth rate for solid-solid couples. Thus, it may be advantageous to use solid pre-forms, e.g., as described above. Other properties, such as inter-metallic layer roughness, can have an effect on the seal quality. For instance, as inter-metallic layers increase in thickness, the roughness also tends to increase, which can cause cleaving failures in some instances. It has been found that if the surface finish roughness can be reduced, less brittle forms of the inter-metallic layers can be formed.

In certain example embodiments, the introduction of a small amount of nickel to lead-free solder perform including Sn and Cu can improve fluidity. Ni can be used to create disturbances in the crystal structure and can facilitate earlier nucleation of the inter-metallic phase during soldering. This could in turn help provide better fluidity and bright solder fillets. Nickel modified SnCu, etc., also may reduce interfacial inter-metallic growth. Doping with trace amounts of rare earth elements also may be useful in these and/or other regards. Cobalt, nickel, antimony, and/or the like, may for example result in a thick initial inter-metallic layer after reflow that acts as a diffusion barrier but that retards subsequent growth of the inter-metallic layer.

Although certain example embodiments have been described in connection with SAC-related alloys, it will be appreciated that Zintl materials may be used. Zintl materials include Group 1 (alkali metals) or Group 2 (alkaline earths) and, post-transition metals or metalloids from Group 13, 14, 15, or 16. Moreover, certain example embodiments may include any suitable alloy based on tin including a Zintl material and/or anion. Similarly, although certain example embodiments have been described in connection with SAC-related alloys, it will be appreciated that other metal alloys based on post-transition metals or metalloids from Group 13, 14, 15, or 16 and transition elements may also be used. For instance, certain example embodiments may include a metallic alloy pre-form based on inter-metallics of Sn and one or more additional materials selected from post-transition metals or metalloids; Zintl anions (e.g., In, Bi, etc.) from group 13, 14, 15 or 16; and transition metals (e.g., Cu, Ag, Ni, etc.); and excludes Pb. This may include other materials such as, for example, In, In and Ag, Bi and In, etc. In general, any Indalloy alloy material (e.g., available form the Indium Corporation) may be used in connection with certain example embodiments, and those that lack lead may be preferred for at least the reasons provided above. In certain example embodiments, other materials that are not Sn-based (e.g., that are based on some other metallic material) may be used.

The terms "heat treatment" and "heat treating" as used herein mean heating the article to a temperature sufficient to achieve thermal tempering and/or heat strengthening of the glass-inclusive article. This definition includes, for example, heating a coated article in an oven or furnace at a temperature of at least about 550 degrees C., more preferably at least about 580 degrees C., more preferably at least about 600 degrees C., more preferably at least about 620 degrees C., and most preferably at least about 650 degrees C. for a sufficient period to allow tempering and/or heat strengthening. This may be for at least about two minutes, up to about 10 minutes, up to 15 minutes, etc., in certain example embodiments.

It is noted that the VIG units may be used in a number of different applications including, for example, residential and/or commercial window applications, skylights, merchandizers, OLED and/or other display packages, etc. One or both substrates of the VIG unit may be heat treated (e.g., heat strengthened and/or thermally tempered) in different example embodiments. In certain example embodiments, a laminate of glass (e.g., glass/PVB or glass/EVA) can be mated with itself or a monolithic glass lite to make a VIG unit with or without a pump-out tube.

Although certain example embodiments have been described in connection with VIG units, it will be appreciated that the example techniques described herein may include one or more substrates formed from a material other than glass. In other words, because the example techniques herein are able to form hermetic seals at low processing times and temperatures, it becomes possible to use alternative substrate materials such as, for example, plastics, Plexiglas, etc. As alluded to above, such materials may be used as one or both substrates in a vacuum insulating panel (VIP) unit or the like. Any or all of the features, aspects, techniques, configurations, etc., as described above can be used in such VIP units. Moreover, it will be appreciated that the example VIG and VIP units described herein may be laminated to another substrate in certain example embodiments.

The terms "peripheral" and "edge" used herein in connection with seals, for example, do not mean that the seal(s) and/or other element(s) is/are located at the absolute periphery or edge of the unit, but instead mean that the seal(s) and/or other element(s) is/are at least partially located at or near (e.g., within about two inches) an edge of at least one substrate of the unit. Likewise, "edge" as used herein is not limited to the absolute edge of a glass substrate but also may include an area at or near (e.g., within about two inches) of an absolute edge of the substrate(s).

As used herein, the terms "on," "supported by," and the like should not be interpreted to mean that two elements are directly adjacent to one another unless explicitly stated. In other words, a first layer may be said to be "on" or "supported by" a second layer, even if there are one or more layers therebetween.

In certain example embodiments, a method of making a VIG unit is provided. Nickel-inclusive thin film coatings are formed around peripheral edges of first major surfaces of first and second substrates. Spacers are placed on the first major surface of the first substrate. A solid solder pre-form alloy material is placed over and contacting the nickel-inclusive thin film coating formed on the first major surface of the first substrate. The first and second substrates are brought together such that the first major surfaces thereof face one another to form a subassembly. An edge seal is formed, in vacuo, by reactively reflowing the solid solder pre-form alloy material, such that nickel from the nickel-inclusive thin film coatings diffuses into the alloy material and vice versa. Following the formation of the edge seal, which then includes inter-metallic compounds, a cavity formed between the first and second substrates is further evacuated in making the VIG unit. The solid solder pre-form alloy material includes Sn and at least one other material selected from the group consisting of post-transition metals or metalloids; Zintl anions from group 13, 14, 15 or 16; and transition metals.

In addition to the features of the previous paragraph, in certain example embodiments, the solid solder pre-form alloy material may be a solder wire pre-form.

In addition to the features of either of the two previous paragraphs, in certain example embodiments, the solid solder pre-form alloy material may comprise Sn, Ag, and Cu.

In addition to the features of the previous paragraph, in certain example embodiments, the solid solder pre-form alloy material may be SAC305 or SAC0307.

In addition to the features of any of the four previous paragraphs, in certain example embodiments, the nickel-inclusive thin film coatings may each include a layer comprising silver sandwiched between layers comprising nickel.

In addition to the features of the previous paragraph, in certain example embodiments, the layers comprising nickel may each comprise NiCr.

In addition to the features of either of the two previous paragraphs, in certain example embodiments, the layers comprising nickel each may be 20 nm to 1 micron thick, and the layer comprising silver may be 10-500 nm thick.

In addition to the features of any of the three previous paragraphs, in certain example embodiments, the layers comprising nickel may further comprise Cr, Ti, V, and/or W.

In addition to the features of any of the eight previous paragraphs, in certain example embodiments, the nickel-inclusive thin film coatings may be PVD-deposited coatings formed in an inert environment.

In addition to the features of any of the nine previous paragraphs, in certain example embodiments, the forming of the edge seal may be practiced in a partial vacuum with an initial pressure of less than 0.5 Torr.

In addition to the features of any of the 10 previous paragraphs, in certain example embodiments, the forming of the edge seal may further comprise heating the subassembly to a peak temperature of less than 300 degrees C.

In addition to the features of any of the 11 previous paragraphs, in certain example embodiments, the forming of the edge seal may further comprise heating the subassembly to a peak temperature of 240-250 degrees C.

In addition to the features of any of the 12 previous paragraphs, in certain example embodiments, the forming of the edge seal may further comprises heating the subassembly to a peak temperature of that is at least as high as, but no more than 30 degrees C. higher than, an isopleth temperature of the solid solder pre-form alloy material.

In addition to the features of the previous paragraph, in certain example embodiments, static and/or dynamic pressure may be applied to the subassembly at least during edge seal formation.

In addition to the features of either of the two previous paragraphs, in certain example embodiments, the subassembly, at least prior to edge seal formation, may be held together via a tape provided around edges thereof.

In addition to the features of any of the 15 previous paragraphs, in certain example embodiments, the spacers may be lamellar structures.

In addition to the features of any of the 16 previous paragraphs, in certain example embodiments, the edge seal, once formed, may comprise: a layer comprising tin, silver, and copper; first and second layers comprising $(Cu_yNi_{1-y})_6Sn_5$ sandwiching the layer comprising tin, silver, and copper; first and second layers comprising $(Ni_xCu_{1-x})_3Sn_4$ provided between the layers comprising $(Cu_yNi_{1-y})_6Sn_5$ and the first and second glass substrates, respectively; and first and second layers comprising NiCrOx provided between the first and second layers comprising $(Ni_xCu_{1-x})_3Sn_4$ and the first and second glass substrates, respectively.

In addition to the features of any of the 17 previous paragraphs, in certain example embodiments, the further evacuating may be practiced using a pump-out tube.

In addition to the features of any of the 18 previous paragraphs, in certain example embodiments, at least one of the substrates may be a glass substrate that is heat treated.

In addition to the features of any of the 19 previous paragraphs, in certain example embodiments, at least one of the substrates may be a glass substrate that is thermally tempered.

In addition to the features of the previous paragraph, in certain example embodiments, each said glass substrate that is thermally tempered may lose no more than 10% temper strength following said further evacuating.

In addition to the features of any of the 21 previous paragraphs, in certain example embodiments, at least one of the substrates may not be a glass substrate.

In addition to the features of any of the 22 previous paragraphs, in certain example embodiments, a third substrate may be laminated to the first and/or second substrate(s).

In addition to the features of the previous paragraph, in certain example embodiments, the laminating may be performed prior to the forming of the edge seal.

In addition to the features of any of the 24 previous paragraphs, in certain example embodiments, getter may be blanket deposited on the first and/or second substrate.

In addition to the features of any of the 25 previous paragraphs, in certain example embodiments, the VIG unit may be a window unit.

In certain example embodiments, a method of making a VIG unit is provided. Metallic, nickel-inclusive thin film coatings are formed around peripheral edges of first major surfaces of first and second substrates. Spacers are placed on the first major surface of the first substrate. A solder pre-form is placed over and contacting the nickel-inclusive thin film coating formed on the first major surface of the first substrate. The first and second substrates are brought together such that the first major surfaces thereof face one another to form a subassembly. The subassembly is heated to a peak temperature of no more than 250 degrees C. and in an atmosphere less than atmospheric in order to reflow the solder pre-form and form an edge seal. Following the formation of the edge seal, a cavity formed between the first and second substrates is further evacuated in making the VIG unit.

In addition to the features of the previous paragraph, in certain example embodiments, the solder pre-form may comprise Sn, Ag, and Cu.

In addition to the features of either of the two previous paragraphs, in certain example embodiments, the solder pre-form may be based on Sn and may include at least one other material selected from the group consisting of post-transition metals or metalloids; Zintl anions from group 13, 14, 15 or 16; and transition metals.

In addition to the features of any of the three previous paragraphs, in certain example embodiments, the nickel-inclusive thin film coatings may each include a layer comprising silver sandwiched between layers comprising nickel.

In addition to the features of the previous paragraph, in certain example embodiments, the layers comprising nickel may further comprise Cr, Ti, V, and/or W.

In addition to the features of either of the two previous paragraphs, in certain example embodiments, the layers comprising nickel each may be 20 nm to 1 micron thick, and the layer comprising silver may be 10-500 nm thick.

Certain example embodiments relate to a VIG unit made using the method of any of the 32 previous paragraphs.

In certain example embodiments, a VIG unit comprises: first and second substantially parallel spaced apart substrates, with at least one of the first and second substrates being a heat treated glass substrate; a plurality of spacers provided between the first and second substrates; and an edge seal comprising an alloy material including Sn and at least one other material selected from the group consisting of post-transition metals or metalloids; Zintl anions from group 13, 14, 15 or 16; and transition metals and, on each side thereof and in order moving away from the alloy material and towards the first and second substrates, respectively, at least one inter-metallic (IMC) layer and a nickel-inclusive layer.

In addition to the features of the previous paragraph, in certain example embodiments, first and second IMC layers may be sandwiched between the alloy material and the nickel-inclusive layers.

In addition to the features of the previous paragraph, in certain example embodiments, the first IMC layer may comprise $(Cu_yNi_{1-y})_6Sn_5$, and the second IMC layer may comprise $(Ni_xCu_{1-x})_3Sn_4$, and the first IMC layer may be provided closer to the alloy material than the second IMC layer.

In addition to the features of the previous paragraph, in certain example embodiments, the nickel-inclusive layers may each include NiCrOx.

In addition to the features of the previous paragraph, in certain example embodiments, the nickel-inclusive layers each may further include Si.

In addition to the features of any of the five previous paragraphs, in certain example embodiments, the alloy material may comprise Sn, Ag, and Cu.

In addition to the features of any of the six previous paragraphs, in certain example embodiments, the alloy material may be formed from a material having an isopleth temperature no higher than 250 degrees C.

In addition to the features of any of the seven previous paragraphs, in certain example embodiments, the spacers may be lamellar structures.

In addition to the features of any of the eight previous paragraphs, in certain example embodiments, a tipped-off pump-out tube may be provided.

In addition to the features of any of the nine previous paragraphs, in certain example embodiments, the at least one substrate that is heat treated may be thermally tempered.

In addition to the features of any of the 10 previous paragraphs, in certain example embodiments, a third substrate may be laminated to the first and/or second substrate(s).

In addition to the features of the previous paragraph, in certain example embodiments, at least one of the substrates may not be a glass substrate.

In addition to the features of any of the 12 previous paragraphs, in certain example embodiments, a secondary peripheral polymeric seal may be provided, and it may comprise at least one of a silicone, polyamide, and PIB.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A vacuum insulating glass (VIG) window unit, comprising:
   first and second substantially parallel spaced apart substrates, at least one of the first and second substrates of the VIG window unit being a heat treated glass substrate;
   an evacuated gap provided between the glass substrates at a pressure less than atmospheric pressure;
   a plurality of spacers provided between the first and second substrates; and
   an edge seal comprising an alloy material including Sn and at least one other material selected from the group consisting of post-transition metals or metalloids from groups 13-15; and Zintl anions from group 13, 14, 15 or 16 and, on each side thereof and in order moving away from the alloy material and towards the first and second substrates, respectively, at least one inter-metallic (IMC) layer, a layer comprising silver, and a layer comprising NiCr that contacts the layer comprising silver.

2. The VIG unit of claim 1, wherein first and second IMC layers are sandwiched between the alloy material and the nickel-inclusive layers.

3. The VIG unit of claim 2, wherein the first IMC layer comprises $(Cu_yNi_{1-y})_6Sn_5$, and the second IMC layer comprises $(Ni_xCu_{1-x})_3Sn_4$, and the first IMC layer is provided closer to the alloy material than the second IMC layer.

4. The VIG unit of claim 1, wherein the layers comprising NiCr are oxidized.

5. The VIG unit of claim 1, wherein the alloy material is formed from a material having an isopleth temperature no higher than 250 degrees C.

6. The VIG unit of claim 1, wherein the spacers are lamellar structures.

7. The VIG unit of claim 1, further comprising a tipped-off pump-out tube.

8. The VIG unit of claim 1, wherein the at least one substrate that is heat treated is thermally tempered.

9. The VIG unit of claim 1, further comprising a third substrate laminated to the first and/or second substrate(s).

10. The VIG unit of claim 9, wherein at least one of the substrates is not a glass substrate.

11. The VIG unit of claim 1, further comprising a secondary peripheral polymeric seal comprising at least one of a silicone, polyamide, and PIB.

12. A vacuum insulating glass (VIG) window unit, comprising:
   first and second substantially parallel spaced apart substrates, at least one of the substrates being a glass substrate;
   a plurality of spacers provided between the first and second substrates for spacing the substrates; and
   an edge seal between the substrates for sealing an interior low pressure cavity, the low pressure cavity having a pressure less than atmospheric pressure,
   wherein the edge seal comprises an alloy including Sn and at least one other material, said at least one other material being selected from the group consisting of post-transition metals or metalloids, Zintl anions from group 13, 14, 15 and/or 16, and transition metals; and
   wherein on each side of said alloy including Sn and at least one other material there is provided, in order moving away from said alloy including Sn and at least one other material and towards the first and second substrates, respectively, at least one inter-metallic (IMC) layer, a layer comprising silver, and a layer comprising NiCr.

13. The VIG window unit of claim 12, wherein first and second IMC layers are sandwiched between the alloy material and the layers comprising NiCr that contacts the layer comprising silver.

14. The VIG window unit of claim 12, wherein the first IMC layer comprises $(Cu_yNi_{1-y})_6Sn_5$, and the second IMC layer comprises $(Ni_xCu_{1-x})_3Sn_4$.

15. The VIG window unit of claim 12, wherein the substrates are glass substrates.

16. The VIG window unit of claim 15, wherein the glass substrates are thermally tempered.

17. The VIG window unit of claim 12, wherein the layers comprising NiCr are oxided.

18. The VIG window unit of claim 12, wherein said alloy comprising Sn and at least one other material comprises Sn, Ag, and Cu.

* * * * *